United States Patent
El Kolli et al.

(10) Patent No.: US 8,289,947 B2
(45) Date of Patent: Oct. 16, 2012

(54) METHOD FOR SYNCHRONIZING A DATA STREAM TRANSMITTED ON A COMMUNICATIONS NETWORK, CORRESPONDING COMPUTER-READABLE STORAGE MEDIUM AND RECEIVER DEVICE

(75) Inventors: Yacine El Kolli, Rennes (FR); Pierre Visa, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 603 days.

(21) Appl. No.: 12/437,454

(22) Filed: May 7, 2009

(65) Prior Publication Data
US 2009/0279530 A1  Nov. 12, 2009

(30) Foreign Application Priority Data
May 9, 2008  (FR) .................................... 08 53057

(51) Int. Cl.
*H04J 3/06* (2006.01)
*H03M 13/00* (2006.01)
(52) U.S. Cl. ........................................ 370/350; 714/758
(58) Field of Classification Search .................. None
See application file for complete search history.

(56) References Cited

U.S. PATENT DOCUMENTS

| | | | |
|---|---|---|---|
| 5,410,536 A | 4/1995 | Shah et al. ...................... 370/13 |
| 5,610,983 A * | 3/1997 | Stewart ........................ 375/357 |
| 5,896,388 A | 4/1999 | Earnest ........................ 370/395 |
| 6,442,403 B1 | 8/2002 | Becot et al. ................... 455/556 |
| 6,658,027 B1 | 12/2003 | Kramer et al. ................ 370/516 |
| 2006/0200725 A1* | 9/2006 | Kikuchi et al. ............... 714/758 |
| 2009/0180465 A1 | 7/2009 | Closset et al. ................ 370/350 |

* cited by examiner

*Primary Examiner* — John Blanton
(74) *Attorney, Agent, or Firm* — Fitzpatrick, Cella, Harper & Scinto

(57) ABSTRACT

A method is proposed for synchronizing a data stream transmitted on a communications network, the data stream being transmitted from an emitter device to a receiver device in the form of data packets of predefined size, a data packet being filled up with a padding synchronization symbol if an amount of applications data to be transmitted in the data packet is below the predefined size of the data packet. The receiver device performs the following steps:

obtaining an indication of a recurrence of filling of the data packets with padding synchronization symbols;

upon detection, at a position in the data stream, of a data loss symbol representative of a lost data in a given data packet, predicting whether the lost data corresponds to an applications data or a padding synchronization symbol, as a function of a position of the given data packets in the recurrence; and marking that the data stream contains, at the data loss symbol position, an erroneous applications data, if the result of the predicting step is that the lost data corresponds to an applications data; or replacing the data loss symbol by a padding synchronization symbol, if the result of the predicting step is that the lost data corresponds to a padding synchronization symbol.

9 Claims, 11 Drawing Sheets

METHOD FOR SYNCHRONIZING A DATA STREAM TRANSMITTED ON A COMMUNICATIONS NETWORK, CORRESPONDING COMPUTER-READABLE STORAGE MEDIUM AND RECEIVER DEVICE

1. FIELD OF THE INVENTION

The field of the invention is that of communications systems (notably, but not exclusively, synchronous communications systems).

More specifically, a particular embodiment of the invention pertains to a technique which, following the loss of applications data, enables the management of the synchronism between at least two receiver nodes of a same communications system, for example an n-channel audio system.

2. TECHNOLOGICAL BACKGROUND

Here below, we shall strive more particularly to describe the existing issues and questions faced by the inventors of the present application in a wireless synchronous communications system. The invention is of course not limited to this particular context of application but is worthwhile in all cases in which a data stream is transmitted on a communications network, the data stream being transmitted from an emitter device to a receiver device in the form of data packets of predefined size, a data packet being filled up with a padding synchronization symbol if an amount of applications data to be transmitted in said data packet is below the predefined size of the data packet.

The terms "data packet" are synonymous with the terms "data formats" (see notably the description of FIGS. 3 and 4).

For a wireless synchronous communications system, or more generally for a synchronous communications system provided with a non-reliable mode of transport, a fixed bandwidth is reserved for the transport of an isochronous constant bit rate stream. The reservation is done through virtual channels at constant bit rate.

Classically, the aggregation of the bit-rates of virtual channels is always greater than the bit-rate needed to transport the isochronous constant bit rate stream.

Indeed, if the bit-rate of the isochronous stream is not entirely divisible by the bit-rate of a virtual channel, then a higher bit-rate is reserved in order to ensure the transport of the isochronous stream. If the bit-rate of the isochronous stream is exactly divisible by the bit-rate of a virtual channel, then the transport of the isochronous stream is theoretically possible through the number of virtual channels obtained by the division of the bit-rate of the synchronous stream by the bit-rate of a virtual channel.

However, for an audio multi-channel application for example, the fact that the applications clock that governs the generation of the isochronous stream and the network clock that clocks a TDM (Time Division Multiplexing) cycle of the network are independent of each other does not ensure the precise concordance of the bit-rates at each TDM cycle of the synchronous network. It is then necessary to reserve additional bandwidth in order to ensure that the entire isochronous stream is definitely transported.

Consequently, on all the virtual channels allocated to the transport of an isochronous constant bit rate stream, the last virtual channel is not used routinely at each TDM cycle of the synchronous network.

Classically, padding data, also called synchronization symbols or NULL symbols here below in the description, are inserted into these unused virtual channels. These pieces of padding data are explicitly marked as such and serve solely to ensure that an identical number of data elements is sent at each TDM cycle.

Thus, the entire sequence of virtual channels at each TDM cycle is transported by the insertion therein of these padding symbols at the position of the empty channels. The clocking of the data of a stream on a receiver node is thus simplified.

However, in the context of a non-reliable transportation system and in the event of data losses, it is impossible to know if the content of a virtual channel lost during a TDM cycle corresponded to real data given by an application and designed to be transported or else if this data was simply padding data.

The problem of not knowing the nature of the content of the lost virtual channels (the presence or not of data) is a particularly sensitive one in the case of a set of data streams that have to be synchronized with one another, as is the case for an application to a 5.1 home cinema type audio multi-channel application.

Indeed, in an application of this kind an audio channel can be sent to several different destinations. This makes it necessary for the audio samples of each isochronous streams sent at the same point in time to be processed at the same time and in the same order by each destination.

The guarantee of synchronism is thus obtained by the fact of sending the same number of data elements to each destination node (each node processes the same number of data elements).

Methods for synchronizing data streams, known to those skilled in the art, are based on protocol layers within isochronous data generating devices which use data time-stamping techniques that enable the definition of the instant at which the data must be provided, at the sink device level, to the higher protocol layer.

However, these mechanisms necessitate the computation of these time-stamping data elements and thus increase transport latency. Furthermore, these mechanisms necessitate precise and absolute synchronization of the internal clocks of the sender and receiver devices in order that these devices may have the same time reference at their disposal.

Now, in the absence of time-stamping, if a node loses data elements without knowing how many data elements have been lost (whether or not in the presence of synchronization symbols), then there is a risk that this node will delay the restitution of its isochronous stream relatively to the other nodes which have accurately received the data. In the case of an audio multi-channel application, there is then a risk that the sound restitution of the receivers might generate a sound echo.

At present, there are several techniques using synchronization symbols.

Thus, synchronous communications networks such as the SONET (for Synchronous Optical Networking) based on optical fibers use synchronization symbols to indicate an absence of streams.

However, optic fiber transmissions are very reliable and data losses in such carriers are rare. Thus, there is no need for techniques to manage losses of synchronization symbols.

Technologies such as the HDLC (High Level Data Link Control) also use a "NULL" symbol to complement a data frame when a transmitter is short of data, as described in the document U.S. Pat. No. 5,410,536. In this document U.S. Pat. No. 5,410,536 the loss of data is managed by an acknowledgement and retransmission system.

An error management system of this kind does not entail the need to determine the nature of the lost data, i.e. the need to know if the lost data is a piece of real data of a data frame or else "NULL" symbol.

Again, owing to the delays caused by retransmission, this technique is not suited to the transportation of audio and/or video type data necessitating a transportation of data in the form of synchronous and constant streams.

Another document U.S. Pat. No. 5,896,388 describes a mode of transport of synchronous data on an asynchronous network using a phase-locked loop or PLL in order to reconstitute the transmission clock at the receiver node level.

This technique is used to wipe out the variations in transmission times inherent in the asynchronous network, firstly by temporarily storing a certain quantity of data at reception and secondly by reading the data from the temporary storage at an almost constant pace, the pace being accelerated if the store gets filled to quickly or else slowed down if the store empties too quickly. This technique enables the approximate reconstitution of the transmission clock if there is no loss of data in the asynchronous network. This technique inserts systems data when a loss of applications data is detected, and does so in order to compensate for the loss of data and comply with the temporary storage filling rate.

However, this technique cannot be used to determine the nature of the lost data (i.e. whether it is applications data or systems data).

Another system described in the document U.S. Pat. No. 6,658,027 enables the management of the temporary reception storage by the elimination or addition of data, depending in whether the storage gets empty too quickly or not quickly enough, in order to correct the synchronism of the network.

However, these systems do not use methods to determine the type of the data losses.

3. GOALS OF THE INVENTION

The invention, in at least one embodiment, is aimed especially at overcoming these different drawbacks of the prior art.

The present invention is aimed especially at ensuring the synchronism of the data by identification of the data lost during the transportation of a routine sequence of virtual channels used to transport an isochronous stream at constant bit-rate.

4. SUMMARY OF THE INVENTION

One particular embodiment of the invention proposes a method for synchronizing a data stream transmitted on a communications network, the data stream being transmitted from an emitter device to a receiver device in the form of data packets of predefined size, a data packet being filled up with a padding synchronization symbol if an amount of applications data to be transmitted in said data packet is below the predefined size of said data packet. The receiver device performs the following steps:

obtaining an indication of a recurrence of filling of said data packets with padding synchronization symbols;
  upon detection, at a position in said data stream, of a data loss symbol representative of a lost data in a given data packet, predicting whether the lost data corresponds to an applications data or a padding synchronization symbol, as a function of a position of said given data packets in said recurrence; and
  marking that said data stream contains, at said data loss symbol position, an erroneous applications data, if the result of said predicting step is that said lost data corresponds to an applications data; or
  replacing said data loss symbol by a padding synchronization symbol, if the result of said predicting step is that said lost data corresponds to a padding synchronization symbol.

Thus, this embodiment of the invention enables the instantaneous determining of the nature (either an applications data or a padding synchronization symbol) of a lost data, which has the advantage of keeping a constant transaction period (unlike the system based on acknowledgements and retransmission in the event of data loss). The synchronism between the different receiver devices is thus maintained.

In a particular embodiment of the invention, the receiver device performs the following steps:

counting a number of padding synchronization symbols received, including data loss symbols replaced by padding synchronization symbols;
  receiving a piece of information from the sender device indicating a number of padding synchronization symbols sent;
  if said number of padding synchronization symbols sent is greater than said number of padding synchronization symbols received, replacing an applications data by a padding synchronization symbol in said data stream.

The correction of prediction is done by replacing an applications data by a synchronization symbol once the predicted number of synchronization symbols is not sufficient. This prediction correction step thus makes it possible to keep the synchronization of the scheduling of the isochronous streams of a multi-channel application in the event of data losses by one or more nodes and to diminish the effects of data losses during the restitution of the sender applications stream.

In another particular embodiment of the invention, the receiver device performs the following steps:

counting a number of padding synchronization symbols received, including the data loss symbols replaced by padding synchronization symbols;
  receiving a piece of information from the sender device indicating a number of padding synchronization symbols sent;
  if said number of padding synchronization symbols sent is smaller than said number of padding synchronization symbols received, marking that said data stream contains, at a given padding synchronization symbol position, an erroneous applications data.

The predictive correction is done by replacing a synchronization symbol by an applications data marked as being incorrect when the number of synchronization symbols predicted is too great. This prediction correction step thus makes it possible to keep the synchronization of the scheduling of the isochronous stream of a multi-channel application in the event of data losses by one or more nodes and to diminish the effects of data losses during the restitution of the sender application stream.

According to an advantageous characteristic, each padding synchronization symbol comprises said piece of information indicating a number of padding synchronization symbols sent in said stream.

Thus, no additional bandwidth is required for the transmission of information used to verify the prediction made by the receiver device, the synchronization symbols (padding data) being adapted to this purpose. Furthermore, this means that, should the number of previously predicted synchronization symbols be excessively great, and should it be necessary to replace a synchronization symbol by an erroneous applications data, the operation can be performed directly on the synchronization symbol that was used to detect the fact that the previously predicted number of synchronization symbols is excessively great. Thus, the synchronization correction is reactivated.

Advantageously, said step of obtaining an indication of a recurrence of filling of said data packets with padding synchronization symbols comprises a step of detecting a sequence of data packets comprising two successive sets of data packets, one of said sets comprising at least one data packet in which an applications data is sent and the other of said sets comprising at least one data packet in which a padding synchronization symbol is sent.

Thus, the process of learning of the period of synchronization symbol insertion through the taking of the average of the periods observed enables adaptation to every type of isochronous stream, i.e. every data sampling frequency, especially audio data sampling frequency. This learning phase especially provides greater flexibility in the event of a change in the nature of the isochronous stream. The computation of an average for the process learning of the period furthermore overcomes problems of drifts in network and applications clocks.

The invention also relates to a computer program product downloadable from a communications network and/or recorded on a computer-readable carrier and/or executable by a processor and comprising program code instructions for the implementation of the method according to the invention when said program is executed on a computer.

The invention also relates to a computer-readable storage medium that may possibly be totally or partially detachable, readable by a computer, storing a set of instructions that can be executed by said computer to implement the method, according to any of the different embodiments, for synchronizing a data stream.

The invention also concerns a receiver device, receiving a data stream transmitted on a communications network, the data stream being transmitted from an emitter device to said receiver device in the form of data packets of predefined size, a data packet being filled up with a padding synchronization symbol if an amount of applications data to be transmitted in said data packet is below the predefined size of said data packet. Said receiver device comprises:
  means for obtaining an indication of a recurrence of filling of said data packets with padding synchronization symbols;
  means for predicting, activated upon detection at a position in said data stream of a data loss symbol representative of a lost data in a given data packet, enabling to predict whether the lost data corresponds to an applications data or a padding synchronization symbol, as a function of a position of said given data packets in said recurrence; and
  means for marking that said data stream contains, at said data loss symbol position, an erroneous applications data, if said means for predicting predict that said lost data corresponds to applications data;
  means for replacing said data loss symbol by a padding synchronization symbol, if said means for predicting predict that said lost data corresponds to a padding synchronization symbol.

Advantageously, the receiver device further comprises:
  means for counting a number of padding synchronization symbols received, including the data loss symbols replaced by padding synchronization symbols;
  means for receiving a piece of information from the sender device indicating a number of padding synchronization symbols sent;
  means for replacing an applications data by a padding synchronization symbol in said data stream, if said number of padding synchronization symbols sent is greater than said number of padding synchronization symbols received.

According to another advantageous characteristic, the receiver device further comprises:
  means for counting a number of padding synchronization symbols received, including the data loss symbols replaced by padding synchronization symbols;
  means for receiving a piece of information from the sender device indicating a number of padding synchronization symbols sent;
  means for marking that said data stream contains, at a given padding synchronization symbol position, an erroneous applications data, if said number of padding synchronization symbols sent is smaller than said number of padding synchronization symbols received.

According to an advantageous characteristic, each padding synchronization symbol comprises said piece of information indicating a number of padding synchronization symbols sent in said stream.

Advantageously, the receiver device further comprises means for detecting a sequence of data packets comprising two successive sets of data packets, one of said sets comprising at least one data packet in which an applications data is sent and the other of said sets comprising at least one data packet in which a padding synchronization symbol is sent.

5. LIST OF FIGURES

Other characteristics and advantages of embodiment of the invention shall appear from the following description, given by way of a non-exhaustive indicative example and from the appended drawings of which:

FIG. 1 illustrates a system implementing an embodiment of the invention

FIG. 2 provides a schematic illustration of the architecture of a device (sender or receiver device) according to an embodiment of the invention;

FIG. 3 provides a schematic view of the structure of the data traveling through the different modules of the sender or receiver device of FIG. 1;

6. DETAILED DESCRIPTION

The present invention relates to a technique used to ensure the synchronism of the data by identification, by a receiver device, of the type (or nature) of the data lost during the transport of a constant bit-rate isochronous stream whose data elements are sent by a sender device by means for virtual channels of a synchronous communications network in a predetermined set and sequence of virtual channels of said synchronous communications network.

Here below, an exemplary implementation of the invention is described for an 8-channel audio system based on a wireless communications system.

Figure 1:
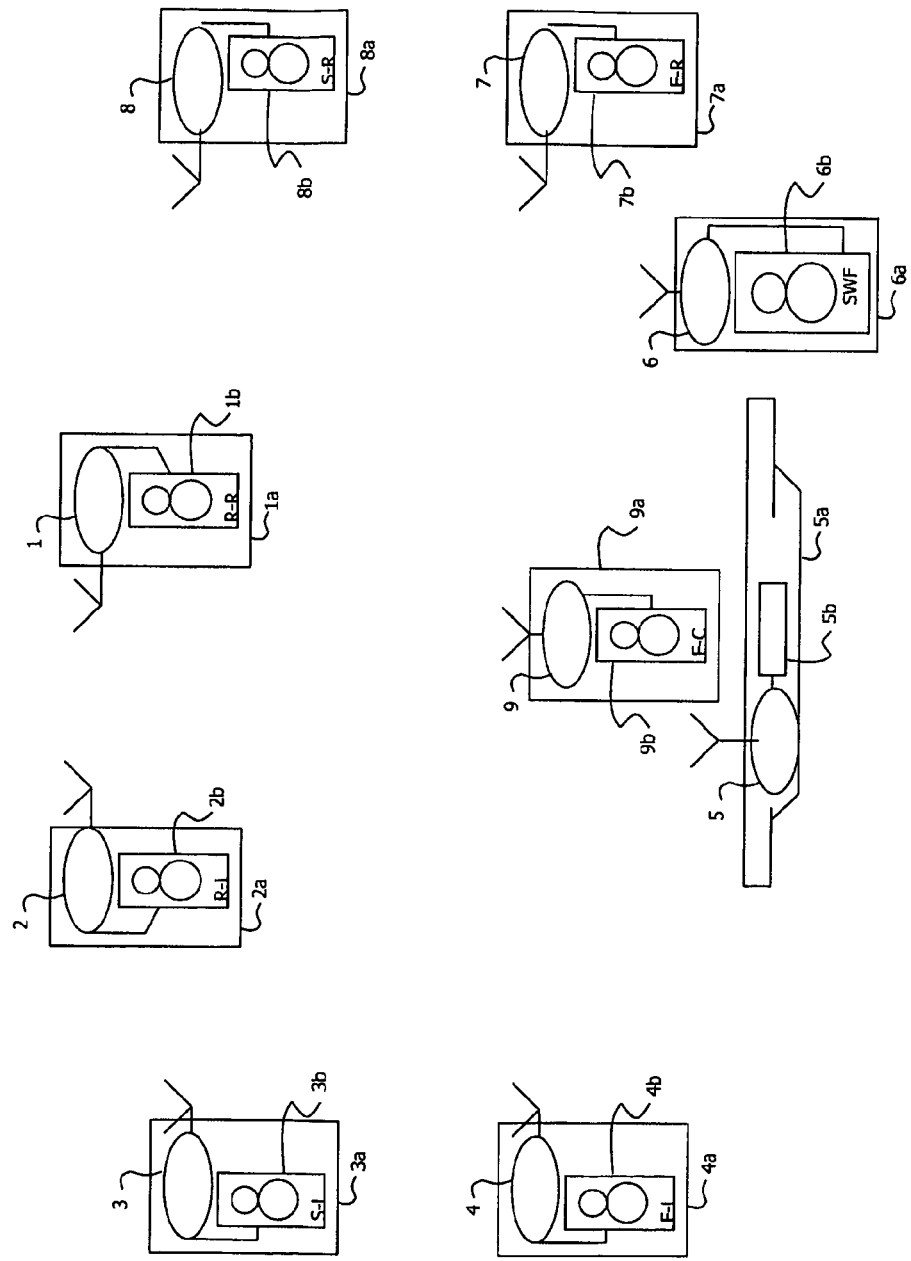

FIG. 1 illustrates an example of a 60 GHz communications system of this kind consisting of nine communication nodes.

More particularly, the system comprises:
- 8 nodes 1a, 2a, 3a, 4a, 6a, 7a, 8a and 9a of the wireless audio receiver or Wireless Audio Renderer (WAR) type, each node being equipped with digital audio channel rendering means each integrating a speaker, respectively 1b, 2b, 3b, 4b, 6b, 7b, 8b, 9b, and
- A wireless audio decoder (WAD) type node 5a comprising a multi-channel audio decoder (or Surround Sound Decoder) 5b.

For example, the surround sound decoder 5b is integrated into a flat screen and is capable of the perfectly synchronized transmission, through the 60 GHz communications system, of the different audio channels associated with the video displayed on the screen.

Each of the devices 1a, 2a, 3a, 4a, 5a, 6a, 7a, 8a and 9a integrates a communications device, also called a synchronous communications module (SCM), respectively 1, 2, 3, 4, 5, 6, 7, 8, 9.

In particular, each receiver device integrates the different means compliant with the invention.

The entire available bandwidth is sub-divided into synchronous virtual channels. The useful bit-rate or payload bit-rate is characterized by the processing frequency of the virtual channels, for example 8 KHz as well as by the size of the samples, for example 48 bits. Thus, a virtual channel (or VC) has a constant bit-rate of 384 Kbps (kilobits per second). A full sequence thus comprises a sample of each of the available virtual channels and constitutes a full synchronous data processing cycle (SDPC) with a duration equal to 125 µs in the case of a processing frequency of 8 KHz for the virtual channels.

For example, an audio channel with the resolution of 96 KHz-24 bits will therefore use 6 virtual channels. For a complete 8-channel system (classically called a 7.1 system), a total of 48 virtual channels is therefore necessary. The payload bit-rate needed is then equal to 18432 megabits per second solely for the transfer of the audio information. If, to this, we add 10 virtual channels allocated to the set of transmission nodes of the system for the transfer of additional information (control of the system, protocol, user command, etc), a SDPC cycle then consists of 58 virtual channels, i.e. a payload bit-rate of 22,272 megabits per second.

The virtual channels 48 to 57 are decoded and then processed by all the nodes for the synchronous exchange of additional data. Thus, each sender synchronous communications module or sender device is allocated at least one virtual channel for the sending of this additional data to all the other receiver devices.

The audio data conveyed in these virtual channels thus form a synchronous data stream.

Thus, as described here above, an audio channel constitutes a synchronous data stream carried in six virtual channels, this number of virtual channels being defined by the sampling of the sender audio application by means for the clock of the synchronous network. For the sake of simplicity of implementation and in order to limit signaling information, especially by avoiding the transmission of indications on data size, the virtual channels contain applications data elements only when these data elements are sufficient in number to enable the complete filling of the virtual channel.

However, the ratio between the sender applications clock and the network clock is not necessarily an integer. The use of the last virtual channel assigned to the transmission of the synchronous data stream is therefore not necessarily done systematically during an SDPC cycle. Thus, cyclically, no data is inserted by the sender application in this last virtual channel.

In order to simplify the transportation of the virtual channels on the network and maintain its synchronous character, all the virtual channels allocated to the transmission of a data stream are conveyed at each SDPC cycle and this is done even when a virtual channel is empty, i.e. when the sender device has written no data whatsoever during the cycle.

A synchronization symbol is then replaced by the synchronous communications module at each empty virtual channel. The network therefore always carries the same sequence of virtual channels at each SDPC cycle, thus removing the need to use the means for identification of the transported virtual channels. Since a synchronization symbol is not a piece of data generated by the sender application, it should not be retransmitted by a receiver synchronous communications module to the destination receiver application of the data stream.

At the level of the WAR type receiver nodes 1a, 2a, 3a, 4a, 6a, 7a, 8a and 9a the synchronous data streams of the audio channel are regenerated by the reading of the virtual channels at the rate of the clock of synchronous network. Then, the data elements are sampled at the rate of the receiver application. It is therefore necessary to reproduce exactly the number of data elements sent by the WAD type sender node 5a in order to maintain the synchronization of the sampling. The presence of synchronization symbols in the data elements received from the network must then be detected by the receiver device. These data elements are used to ensure the clocking of the transmission but should not be transmitted to the destination receiver application that is the destination of the data from the data stream.

Thus, a data loss detected by the receiver device on the last virtual channel assigned to the transmission of a synchronous data stream during an SDPC cycle entails problems. Indeed, maintaining the synchronization of the sampling makes it necessary, for each lost channel, to know if the lost piece of data is real applications data or a synchronization symbol.

A piece of lost data such as this is identified by a symbol "MISSING" as described here below in the description.

Figure 2:
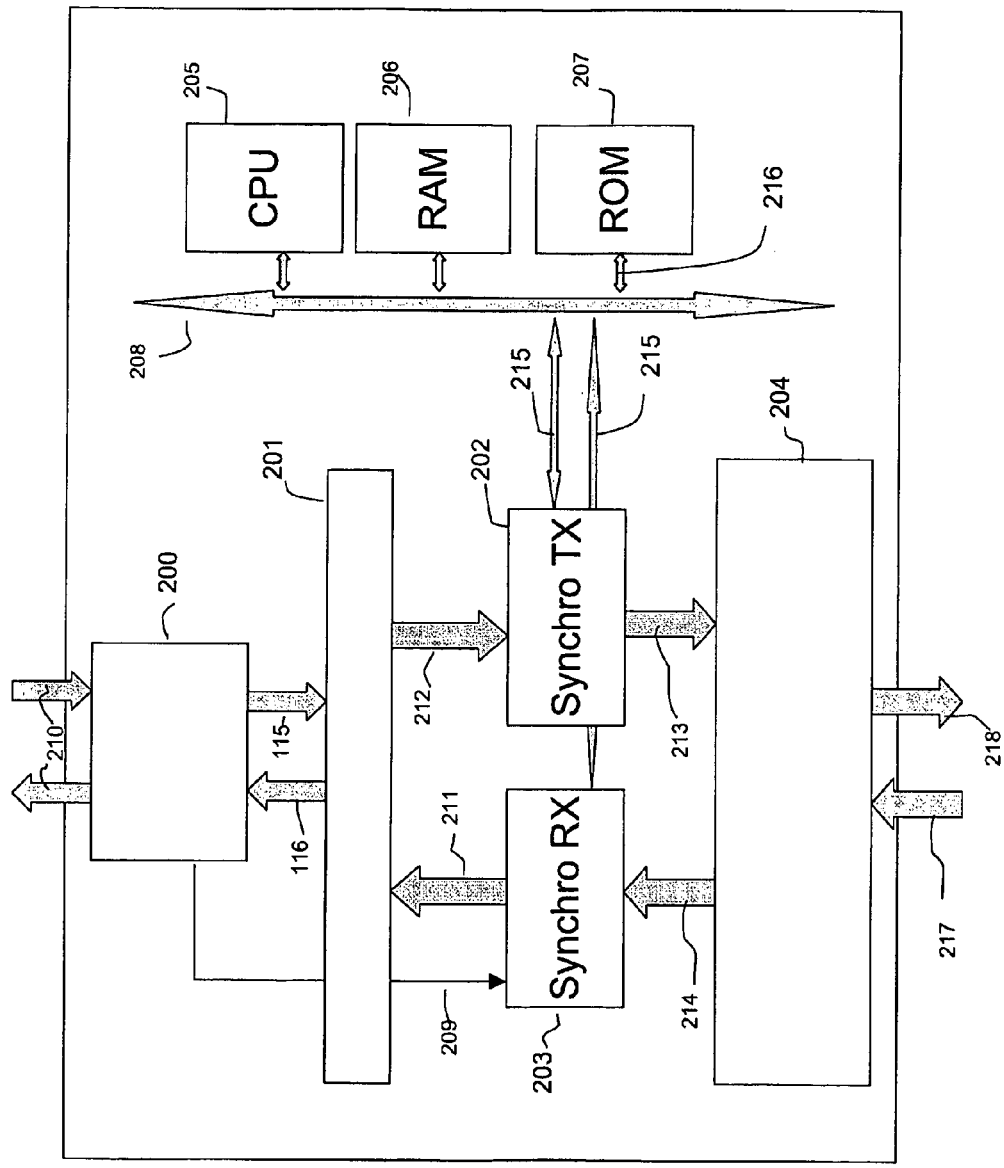

FIG. 2 illustrates a receiver device or sender device according to one embodiment of the invention.

A device of this kind works in transmission and reception and comprises several modules, the role of each of these modules being described here below.

Thus, a sender or receiver device comprises:

A module 200 to manage the presentation of data serving as an interface between a sender application or receiver application and the synchronous network;

An SDPC cycle management module 201;

A reception module "Synchro RX" 203;

A transmission module "Synchro TX" 202;

A network access management module 204;

A central processing unit "CPU" 205;

A random-access memory or "RAM" 206;

A read-only memory or "ROM" 207.

In the embodiment of the invention, a sender or receiver applications interface 210 is an I2S (Inter IC Sound) type digital audio interface well-known to those skilled in the art.

For a sender application, this module 200 for managing the presentation of the sampled data carries out an operation of sampling, during a sampling period, of the different streams of a sender application in differentiated memories, by means for a clock signal derived from the clock signal of the synchronous network, for example an 8 Khz clock signal. This sampling period (or cycle) is also called an SDPC (Synchronous Data Processing Cycle). In the example of a multichannel audio type sender application, each audio channel represents a distinct applications stream.

The data presentation management module 200 is connected to the SDPC cycle management module 201 by means for an interface 115 enabling the sampling, in the underlying synchronous network format, of the applications data of a sender application.

For a receiver application, this data presentation management module 200 delivers the data of an applications stream at the rate of an applications clock signal synchronized with the application clock signal used by the sender device. In the event of data loss notified by the reception module "Synchro RX" 203 (described more specifically here below in the description), this data presentation management module 200 applies an error concealment method directed towards the receiver application.

The data presentation management module 200 is connected to the SDPC cycle management module 201 by means for an interface 116 which enables the sampling, in the underlying synchronous network format, of the applications data received from a sender application by the data presentation management module 200.

The SDPC cycle management module 201 for its part manages the distribution of the synchronous bandwidth of the network, in transmission or in reception. For example, for each SDPC, in the embodiment of the invention, the bandwidth is divided into a certain number of virtual channels having a unit capacity of 48 bits and a frequency of 8 Khz, giving a unit bit-rate of 384 Kbps.

In transmission, a certain number of virtual channels is write-allocated for an applications stream of a sender application. This number is chosen so that the totalized bit-rate of the virtual channels is as close as possible to the applications bit-rate. Naturally, the reserved bit-rate should never be lower than the applications bit-rate. As already explained, it can happen that the last virtual channel allocated to the transmission of a synchronous data stream during an SDPC cycle does not always contain applications data, the totalized bit-rate of the synchronous data stream being, in this case, slightly greater than the applications bit-rate. To indicate this absence of data, the SDPC management module 201 inserts synchronization symbols into these empty virtual channels. This step is known especially as "padding data insertion".

It must be noted that this is not the application that ensures the insertion of padding data. The application remains independent of the transport mode used and of the frequency used.

This makes it possible especially to have synchronous networks capable of managing a multitude of simultaneous applications having frequencies that are completely independent of one another. It is then necessary that the SDPC cycle management module 201 of the corresponding receiver device should detect these synchronization symbols in order to provide the receiver (or consumer) application with only the data provided by the sender (or generator) application and thus maintain the independence of the synchronous network with respect to applications using its services.

In reception in the same way, a set of virtual channels is read-allocated for the applications stream. When a virtual channel contains a synchronization symbol, the SDPC cycle management module 201 sends out no data whatsoever through the first interface 116 to the data presentation management module 200.

As regards the transmission part, the SDPC cycle management module 201 is furthermore connected to the transmission module "Synchro TX" 202 by means for an interface 212. This interface 212 enables the exchange of data whose different formats are described with reference to FIG. 3.

This transmission module "Synchro TX" 202 is in charge of driving the insertion of synchronization symbols and the insertion of additional information into the synchronization symbol so that the receiver devices can get synchronized again in the event of data loss and wrong prediction.

As regards the reception part, the SDPC cycle management module 201 is furthermore connected to the reception module "Synchro RX" 203 by means for an interface 211. This interface 211 enables data exchange whose different formats are described with reference to FIG. 3.

As described here below, a reception module "Synchro RX" 203 manages the detection of a data loss indicated by the network access management module 204.

In the embodiment of the invention, the detection by the network access management module 204 of the receiver device, of a lost piece of data is represented by a symbol "MISSING". This symbol "MISSING" is described in greater detail here below in the description.

When a loss of data for a synchronous data stream is indicated, the reception module "Synchro RX" 203 uses prediction means in order to estimate whether a lost data is a synchronization symbol or else a piece of applications data.

On the basis of this prediction, this module regenerates either a piece of data marked as being incorrect or a synchronization symbol.

Upon the accurate reception of a synchronization symbol, this reception module "Synchro RX" 203 then updates its prediction means for the synchronous data stream concerned, especially using additional information inserted into the synchronization symbol by the transmission module "Synchro TX" 202 of the sender node. When the prediction means are updated, the relevance of the last predictions is verified by means for an additional piece of information on continuity contained in the synchronization symbol (of a "NULL" type).

If prediction errors are detected, this reception module "Synchro RX" 203 is capable of again getting synchronized through a modification of the content of the data delivered to the SDPC cycle management module 201.

The reception module "Synchro RX" 203 and the transmission module "Synchro TX" 202 are furthermore connected to the network access management module 204 through interfaces 214 and 213 respectively. These two interfaces 213 and 214 are used to exchange data whose different formats are described with reference to FIG. 3.

The network access management module 204 for its part manages the shaping of the data in the synchronous network format. It also manages the sending (sender device) and reception (receiver device) of the data synchronously through the network interfaces 217 and 216 respectively.

A central processing unit CPU 205 provided with a read-only memory ROM 207 and a random-access memory RAM 206 complements the architecture of a receiver or sender device.

Using interfaces 208, 215 and 216, the central processing unit CPU 205 resets the various registers of the reception module "Synchro RX" 203 and the transmission module "Synchro TX" 202 when the device is powered on. The default values presented in the read-only memory ROM 207 are loaded into the random-access memory RAM 206 and then into the registers of the reception module "Synchro RX" 203 and the transmission module "Synchro TX" 202.

Figure 3:
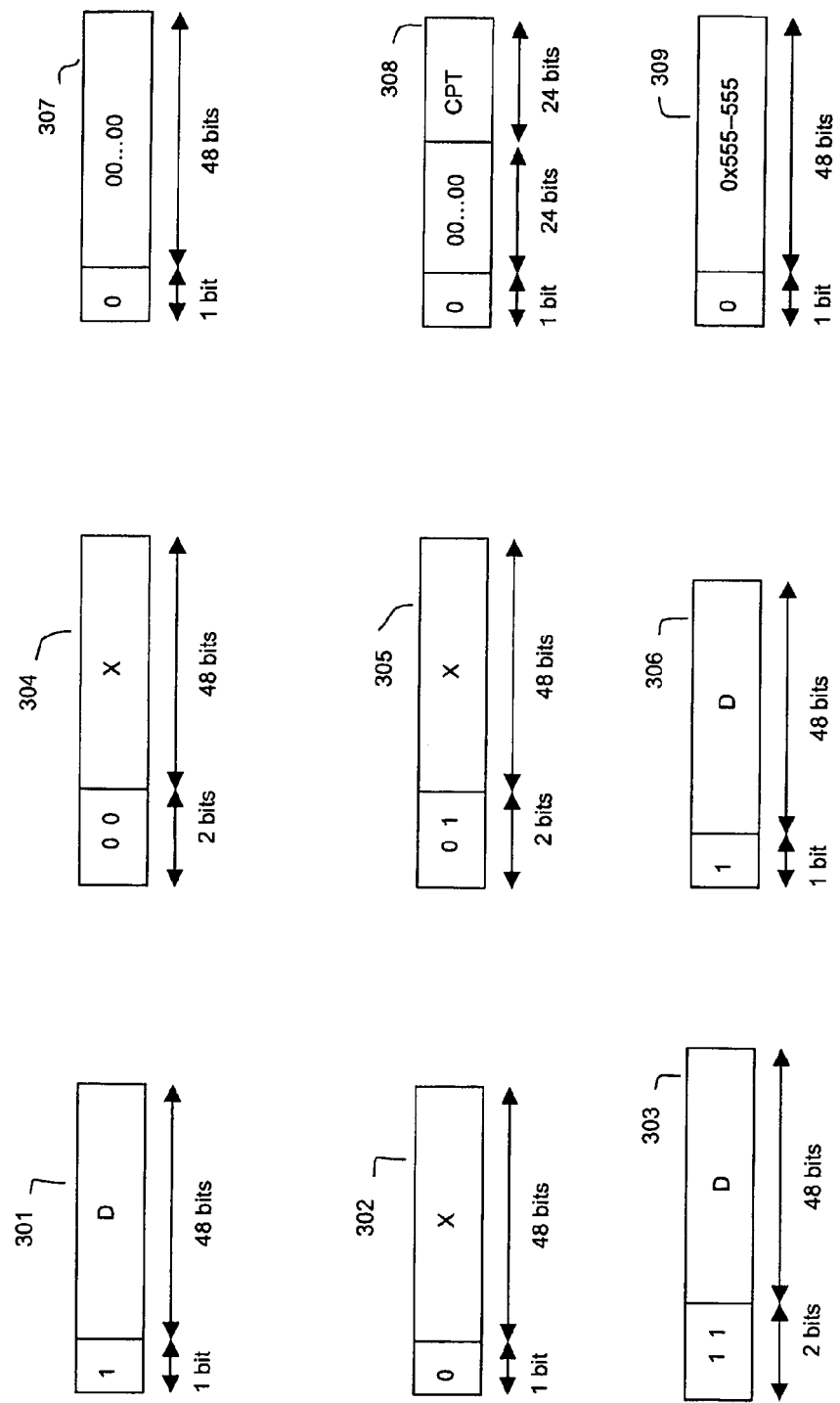

FIG. 3 provides a schematic view of the different data formats (i.e. data packets) traveling through the different modules of a receiver or sender device.

Each data module comprises a payload part encoded on 48 bits and a control part encoded on 1 or 2 bits.

Between the SDPC cycle management module 201 and the transmission module "Synchro TX" 202 there travel in transit, through the interface 212, data encoded on 49 bits, where the bit number 49 is used to indicate the availability of the data for a given virtual channel. A value of 1 of the bit number 49 (format 301) indicates available data. A value at 0 of bit number 49 (format 302) indicates unavailable data. For the format 301, the payload part is encoded on 48 other bits (represented by "D" in the Figure). For the format 302, this part is without significance (and is represented by "X" in the figure).

It must be noted that the different virtual channels are scanned sequentially during a SDPC cycle in a sequence in rising order of the numbers of the virtual channel.

Between the SDPC cycle management module 201 and the reception module "Synchro RX" 203, through the interface 211, there travel data encoded on 50 bits corresponding to three formats 303, 304 and 305 of FIG. 3. Two control bits indicate the nature of the data, namely 11 for a valid type of data (format 303), 00 for a corrupt type of data (format 304) and 01 for an unknown type of data (format 305). The payload part of the format 303 is encoded on the 48 other bits (represented by "D" in the Figure). For the format 304 and 305, this part has no meaning (and is represented by "X" in the figure).

Between the network access management module 204 and the reception module "Synchro RX" 203, data formats 306, 307, 308 and 309 travel through the interface 214.

A format 306 illustrates the data chunk data of type of format for which the reception by the reception module "Synchro RX" 203 may imply the writing of a piece of valid data 203 on the third interface 211. The payload part of this format 306 (represented by "D" in the Figure) is encoded on 48 bits and the control bit number 49 is at 1.

Two formats 307 and 308 respectively illustrate a synchronization symbol without any continuity counter and a synchronization symbol with a continuity counter CPT. These two data formats are received by the reception module "Synchro RX" 203. A reception of a format 307 or 308 by the reception module "Synchro RX" 203 does not activate any writing on the third interface 211. The payload part of these two formats 307 and 308 is encoded on 48 bits and the control bit number 49 is equal to 0.

The synchronization symbol with a continuity counter for CPT (format 308) is used especially for the virtual channels containing data of a synchronous data steam. The payload part of the format 308 in this case has 24 first bits at 0 and a counter field CPT on the last 24 bits.

The synchronization symbol without any continuity counter (format 307) for its part has a payload part encoded on 48 bits having a null value.

A format 309 illustrates a loss detection symbol of the "MISSING" type generated by the network access management module 204 when a data loss is detected. The payload part of the format 309 is equal to 0x555555555555 and the control bit takes the value 0.

A reception format of 309 by the reception module "Synchro RX" 203 may imply the writing of a corrupt piece of data 304 or an unknown piece of data 305 on the third interface 211 or else nothing according to the predictions as described here below in the description.

Between the network access management module 204 and the transmission module "Synchro TX" 202, the data formats 306, 307 and 308 also travel through the interface 213.

Figure 4:
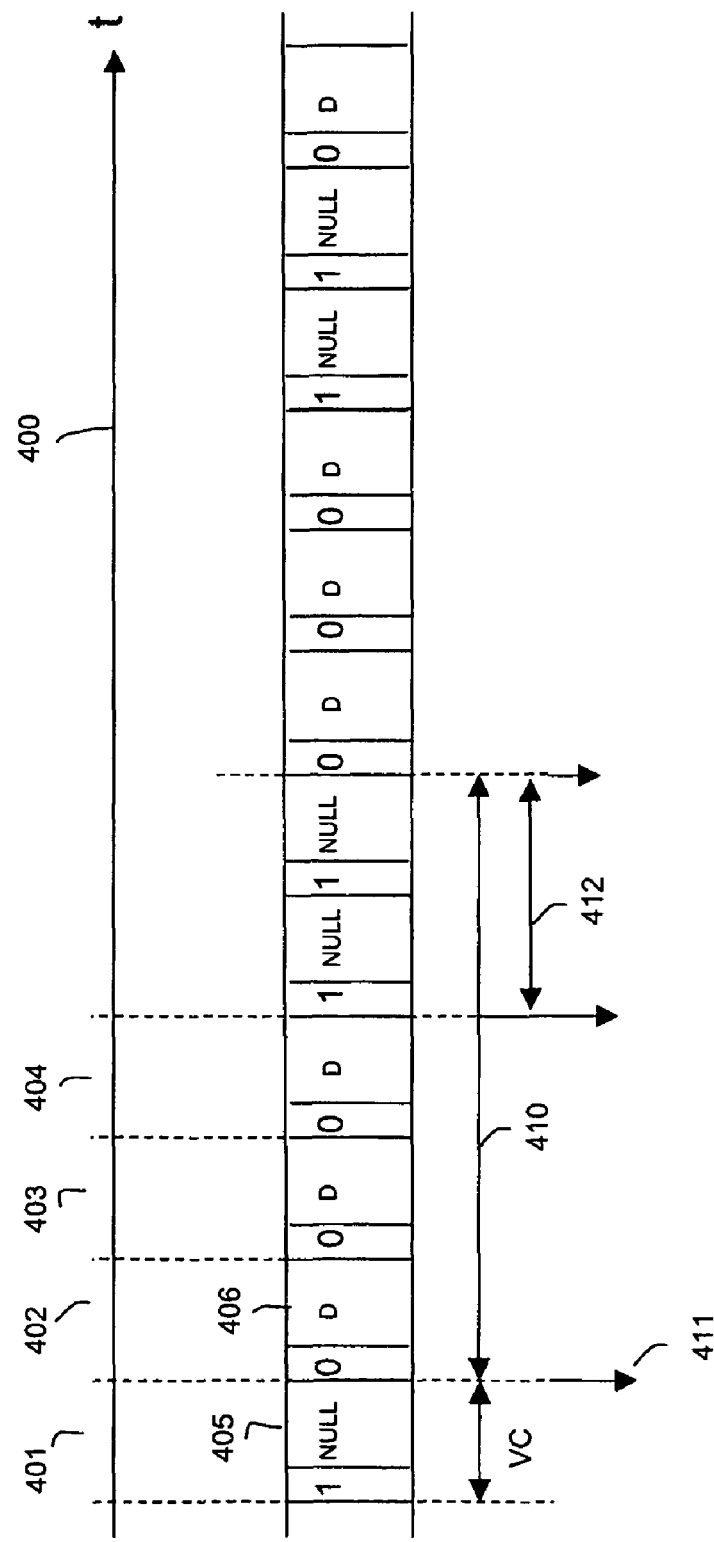
FIG. 4 illustrates an example of succession in time of data chunks and synchronization symbols for a given virtual channel.

FIG. 4 gives an example of succession in time of data formats (i.e. data packets) of two types (data chunk formats and synchronization symbol), solely for the last virtual channel assigned to the transmission of a synchronous data stream during a SDPC cycle.

Let us take a time axis 400 increasing from left to right and divided into SDPC cycles (or TDM cycles) 401, 402, 403, 404. At each SDPC cycle, a data chunk format or a synchronization symbol format is generated for this virtual channel. Thus, at a first SDPC cycle 401, a synchronization symbol 405 with a format 307 or 308 is generated. Then, in a second SDPC 401, a data chunk 406 with a format 306 is generated.

In this example of FIG. 4, the "NULL Period" 410 representing a cyclical appearance of the synchronization symbols is equal to five SDPC cycles and the interval known as "NULL Interval" 412 comprises two cycles (namely two synchronization symbols).

The obtaining of these values of the "NULL Period" 410 and of the interval "NULL Interval" 412 by a prediction module "VC Predictor" is described in greater detail here below in the description.

The value of the "NULL Period" 410 indicates the number of SDPC cycles between two same sequences beginning with a data chunk and ending with a synchronization symbol. Since the synchronous data stream transported is of a constant bit-rate, the transmission scheme defined by the "NULL Period" 410 and by the "NULL Interval" 412 is repeated throughout the duration of the synchronous data stream transmission. An end (or a start) of a "NULL Period" 410 corresponds to the instant between two same sequences of use of a virtual channel beginning with a data chunk and ending with a synchronization symbol.

It is then possible to represent the "NULL Interval" 412 simply by an identifier of the cycle within the "NULL Period" sequence from which the synchronization symbols appear.

Figure 5:
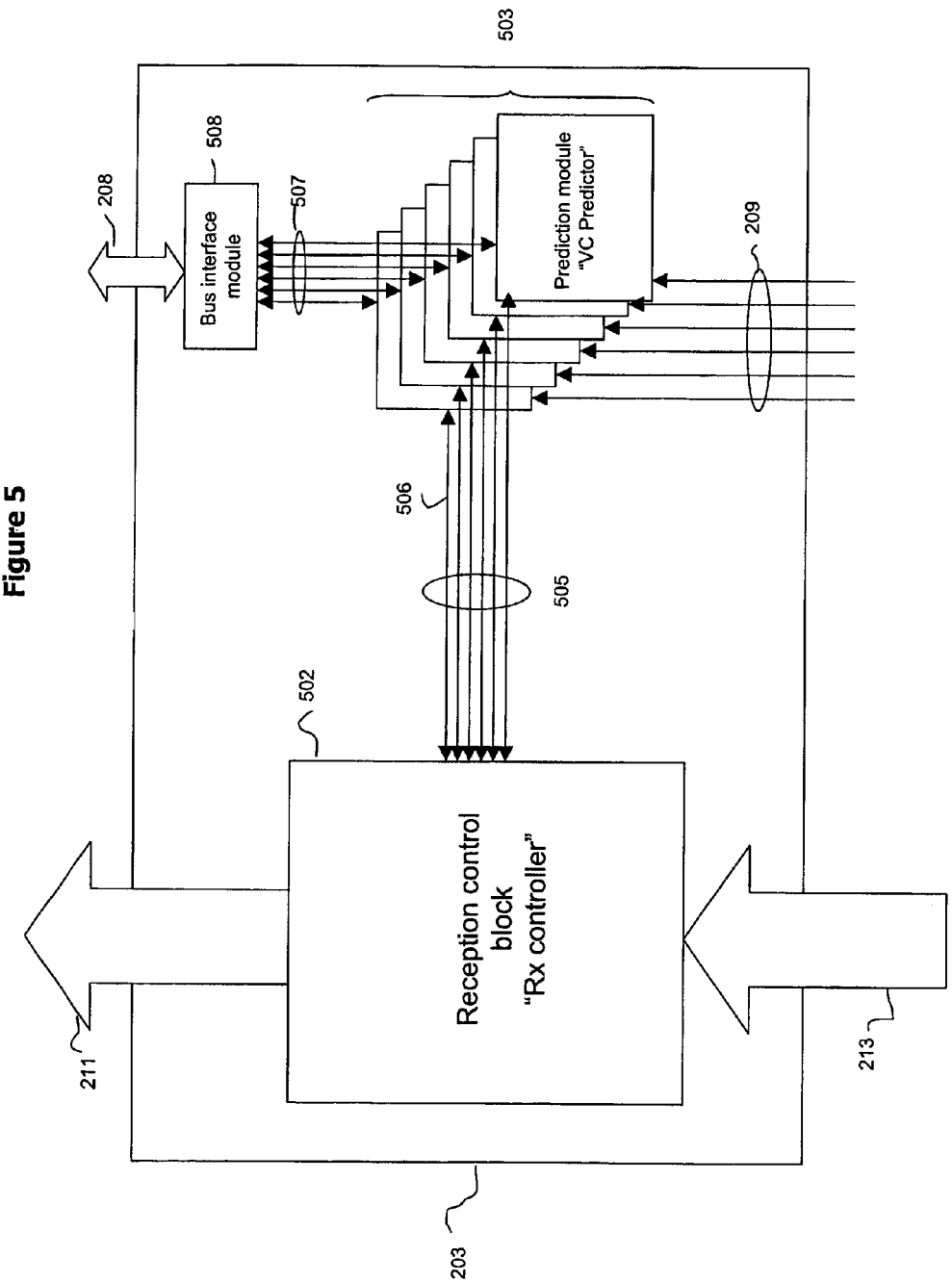
FIG. 5 is a schematic illustration of the structure of a reception module "Synchro RX" of the receiver device of FIG. 1.

FIG. 5 provides a detailed description of the reception module "Synchro RX"203.

The reception module "Synchro RX" 203 consists of a control block "RX Controller" 502 responsible for receiving data chunks or synchronization symbols at each network communications cycle, these data chunks or synchronization symbols representing virtual channels sent by the network access management module 204 through the interface 214.

Each virtual channel furthermore has a corresponding prediction module "VC Predictor" 503 responsible for making a prediction, in the event of detection, by the network access management module 204, of a piece of lost data and responsible for correcting the previous predictions.

Thus, after receiving data from the network access management module 204, the control block "RX Controller" 502 sends the data chunks or synchronization symbols through a set 505 of sub-interfaces 506, where each sub-interface 506, for a given virtual channel, connects the control block "RX Controller" 502 and the prediction module "VC Predictor" 503 corresponding to said given virtual channel.

Then, these data elements are processed by an associated prediction module "VC Predictor" 503. The result of this processing is then returned to the control block "RX Controller" 502 through the set 505 of interfaces 506, and then sent to the SDPC cycle management module 201 through the interface 211.

The detail of these different operations performed by the control block ""RX Controller"" 502 is illustrated in detail with reference to FIG. 7.

Besides, each prediction module "VC Predictor" 503 sends information through the corresponding sub-interface 506. For example, this information relates to the state of the module "VC Predictor" 503 (whether the module is ready or not) and the type of virtual channel.

The different prediction modules "VC Predictor" 503 are also accessible by the central processing unit 205 or CPU through a bus interface module 508 and a set of interfaces 507 connecting each prediction module "VC Predictor" 503 to said bus interface module 508.

The central processing unit CPU 205 accesses especially the prediction modules "VC Predictor" 503 during the resetting phase in order to provide information on the default values of the "NULL Period" and "NULL Interval" registers as introduced previously.

The prediction modules "VC Predictor" 503 are also connected to the SDPC management modules 201 through a set of interfaces 209. Each interface 209 furthermore enables a data presentation management module 200 to send synchronization signals "synchro_ok" to the corresponding prediction module "VC Predictor" 503.

When the signal "synchro_ok" is positive, it means that an application is effectively consuming the data stream corresponding to the virtual channel. If the signal "synchro_ok" is negative, it means that no application (of the receiver device considered) is consuming the data stream corresponding to the virtual channel and therefore the prediction in the event of data loss is not necessary.

Figure 6:
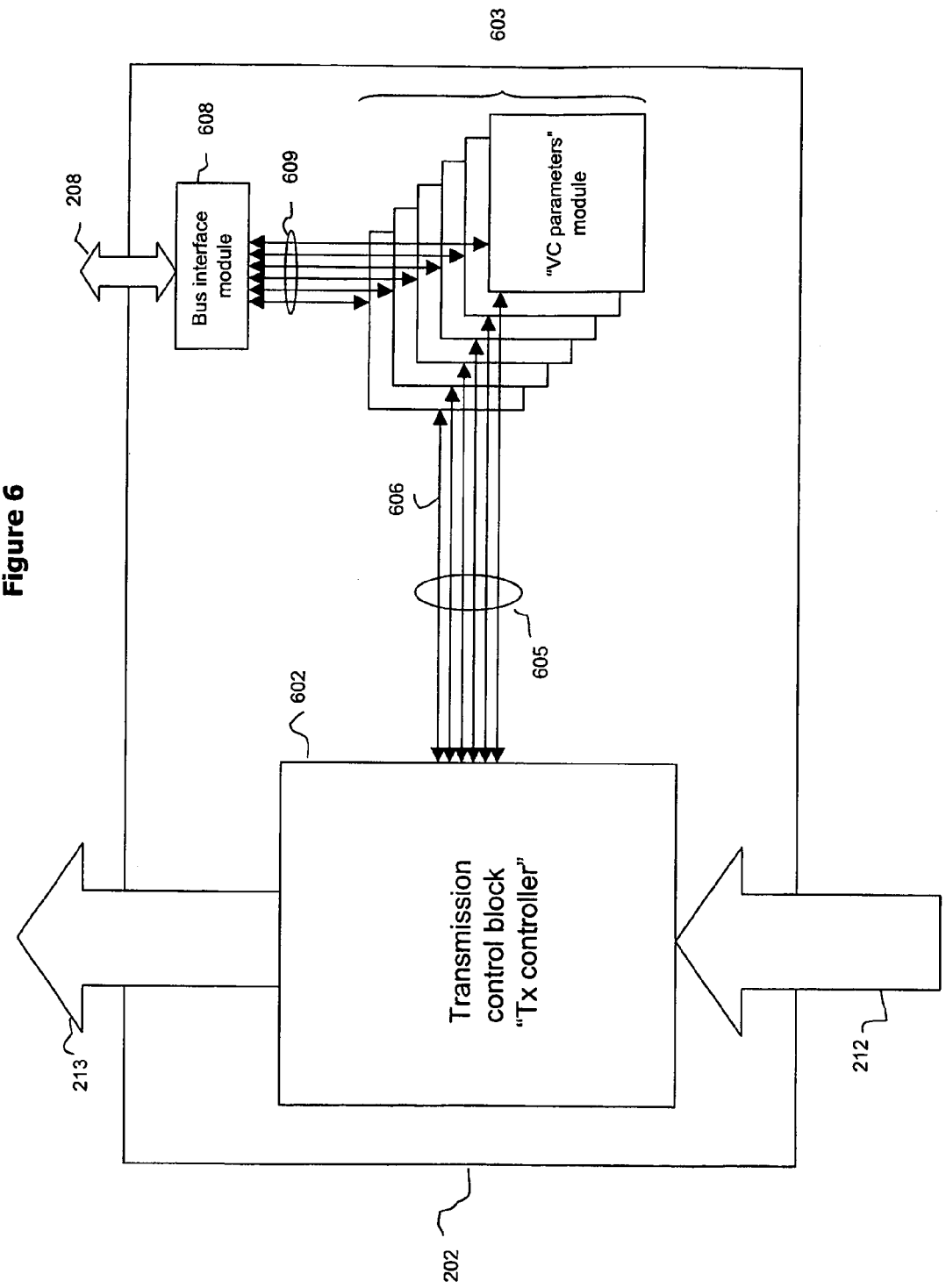
FIG. 6 is a schematic illustration of the structure of a transmission module "Synchro TX" of the sender device of FIG. 1.

FIG. 6 provides a schematic illustration of the transmission module "Synchro TX." 202.

The transmission module "Synchro TX" 202 consists of a control block "TX Controller" 602 responsible for managing the sending of the content of the virtual channels given by the SDPC cycle management module 201 through the interface 212. The control block "TX Controller" 602 inter alia manages the insertion of the synchronization symbols and the implementation of the continuity counters "CPT" of the synchronization symbols for each virtual channel (refer to the format 308 of FIG. 3).

Each virtual channel has a corresponding module "VC Parameters" 603. After reception of the data coming from the SDPC cycle management module 201, the control block "TX Controller" 602 sends each data chunk or synchronization symbol to the module "VC Parameters" 603. This dispatch is done through a set 605 of sub-interfaces 606, each sub-interface 606 connecting, for a given virtual channel, the control block "TX Controller" 602 and the module "VC Parameters" 603 corresponding to said given virtual channel.

Each virtual channel is processed according to initial parameters fixed by the central processing unit "CPU" 205 when the system is started up. These initial parameters are loaded into the module "VC Parameters" 603 through the interface 208. These initial parameters provide information especially on the type of virtual channel, i.e. whether it is a virtual channel intended for the transmission of a synchronous data stream or not, as well as its state (used or not).

Each virtual channel therefore has a corresponding module "VC Parameters" 603 directly accessible by the central processing unit "CPU" 205 through a bus interface module 608, each module "VC Parameters" 603 being connected to the bus interface module 608 through a set of interfaces 609.

Each module "VC Parameters" 603 then sends this information to the control block "TX Controller" 602 through the corresponding sub-interface 606.

Once processed, the data chunks or the synchronization symbols are transmitted to the network access management module 204 by the control block "TX Controller" 602 through the interface 213.

Figure 7:
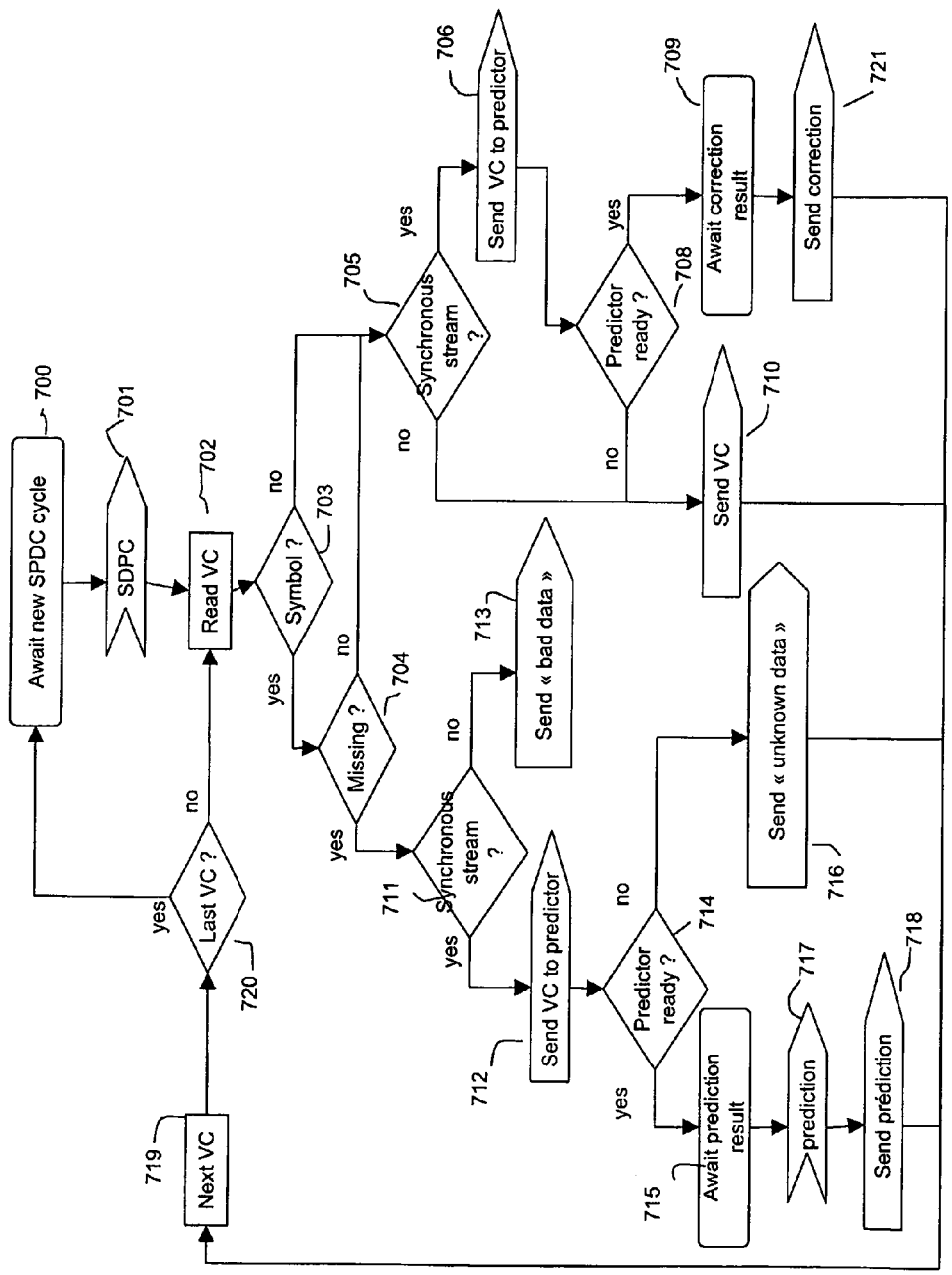
FIG. 7 illustrates a flow chart of the different steps performed by a reception control block "RX Controller" of the reception module "Synchro RX" of FIG. 5.

FIG. 7 is a flow chart of the different steps performed by the control block "RX Controller" 502 of the reception module "Synchro RX" 203.

In a first step 700, the receiver device is in the state of waiting for a new SDPC cycle (or TDM cycle).

In a following step 701, a new SDPC cycle is detected by the receiver device.

In a step 702, a piece of data of a received virtual channel is processed by the network access management module 204.

In a step 703, this piece of data is analyzed in order to determine whether it is a symbol (either a synchronization symbol of a "MISSING" type of symbol). This operation is performed by an examination of the bit number 49 of the data format received (see FIG. 3), a value at 0 of this bit indicating the presence of a synchronization symbol or a "MISSING" type symbol.

If the data contains a symbol (bit 49 at 0), then in a step 704 the data received is analyzed in order to determine whether it is a symbol "MISSING" as described with reference to the format 309 of FIG. 3.

If the piece of data is a symbol "MISSING", then in a step 711, the type of data conveyed by the virtual channel is defined through the corresponding interface 505 in order to ascertain that it is necessary to make a prediction, the predictions being useful only in the case of a virtual channel used to convey data of a synchronous data stream.

If the virtual channel is not assigned to the transmission of a synchronous data stream, then no prediction is needed and, in this case, in a step 713, a error symbol "bad data" 304 is sent to the SDPC cycle management module 201.

If the virtual channel is assigned to the transmission of a synchronous data stream, then a prediction is necessary and, in this case, in a step 712, the data of the virtual channel received is sent through the corresponding interface 506 to the prediction module "VC Predictor" 503 corresponding to said virtual channel.

It must be noted that it is necessary to send the data received to the corresponding prediction module "VC Predictor" 503 even if its initialization depends on the data received (refer to FIG. 8 here below in the description).

In a step 714, the state of the prediction module "VC Predictor" 503 is tested through the interface 505.

If the prediction module "VC Predictor" 503 is ready (in the module ready state) then, in a step 715, the result of the prediction awaits determination.

In a step 717, this result is determined and then sent to the SDPC cycle management module 201 in a step 718.

In a following step 719 described in greater detail here below, a following virtual channel is then analyzed.

In a step 714, if the prediction module "VC Predictor" 503 is not ready (i.e. it is not in the "module ready" state), then a symbol of an unknown data type "unknown data" 305 is sent by default to the SDPC cycle management module 201 in a step 716.

Then, in a following step 719 described in greater detail here below, a following virtual channel is analyzed.

In the step 704, if the data does not contain a "MISSING" symbol, then in a step 705, the type of virtual channel VC is verified.

It must be noted that this step 705 is also performed if the data does not contain any synchronization symbols (703), i.e. if the bit number 49 takes the value 1.

If the virtual channel VC is not assigned to the transmission of a synchronous data stream, the data is not processed and sent directly to the SDPC cycle management module 201 in a step 710.

If the virtual channel VC is assigned to the transmission of a synchronous data stream, then in a step 706, the data is sent to the corresponding prediction module "VC Predictor" 503 so that a correction of prediction if necessary is applied.

As mentioned here above, the virtual channel is sent to the prediction module "VC Predictor" 503 even if this module is not yet ready because its initialization requires the reception of data. This point is described more broadly here below in the description with reference to FIG. 8.

Then, in a step 708, the state of the corresponding prediction module "VC Predictor" 503 is obtained.

If the prediction module "VC Predictor" 503 is not ready (i.e. it is not in the "module ready" state), then the data is unchanged and is sent to the SDPC cycle management module 201 in a step 710.

If the prediction module "VC Predictor" 503 is ready (i.e. it is in the "module ready" state), then the result of a correction if any awaits reception in a step 709.

Then the result (whether corrected or not) is sent to the SDPC cycle management module 201 in a step 721.

Then, in a step 719, a next virtual channel is analyzed.

In a step 720, a check is made to see if all the virtual channels have already been processed and if this is the case, then a new SDPC cycle is analyzed in a new step 700.

If not, there remain virtual channels to be processed. The set of steps starting from the steps 702 is then repeated.

Figure 8:
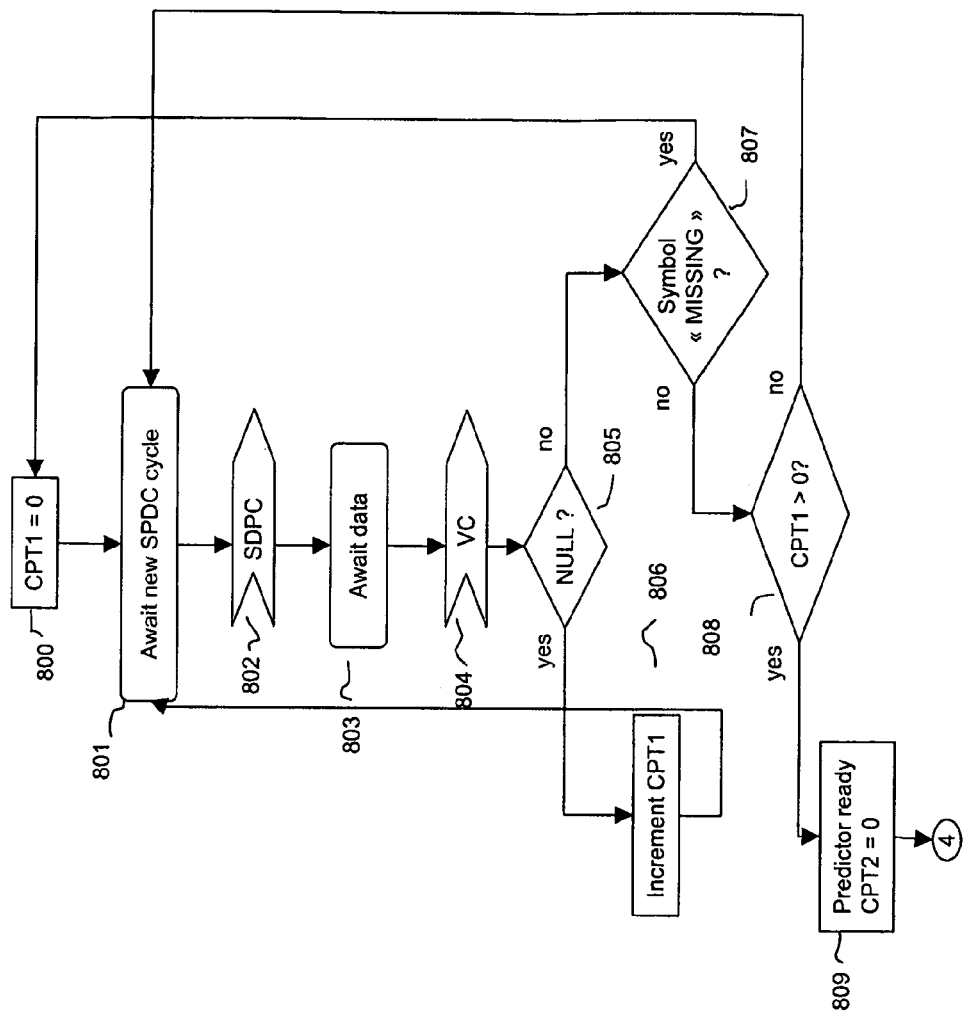
FIG. 8 illustrates a flow chart of the different steps performed during a phase known as an initial phase by a prediction module "VC Predictor" of the reception module "Synchro RX" of FIG. 5.
Figure 9:
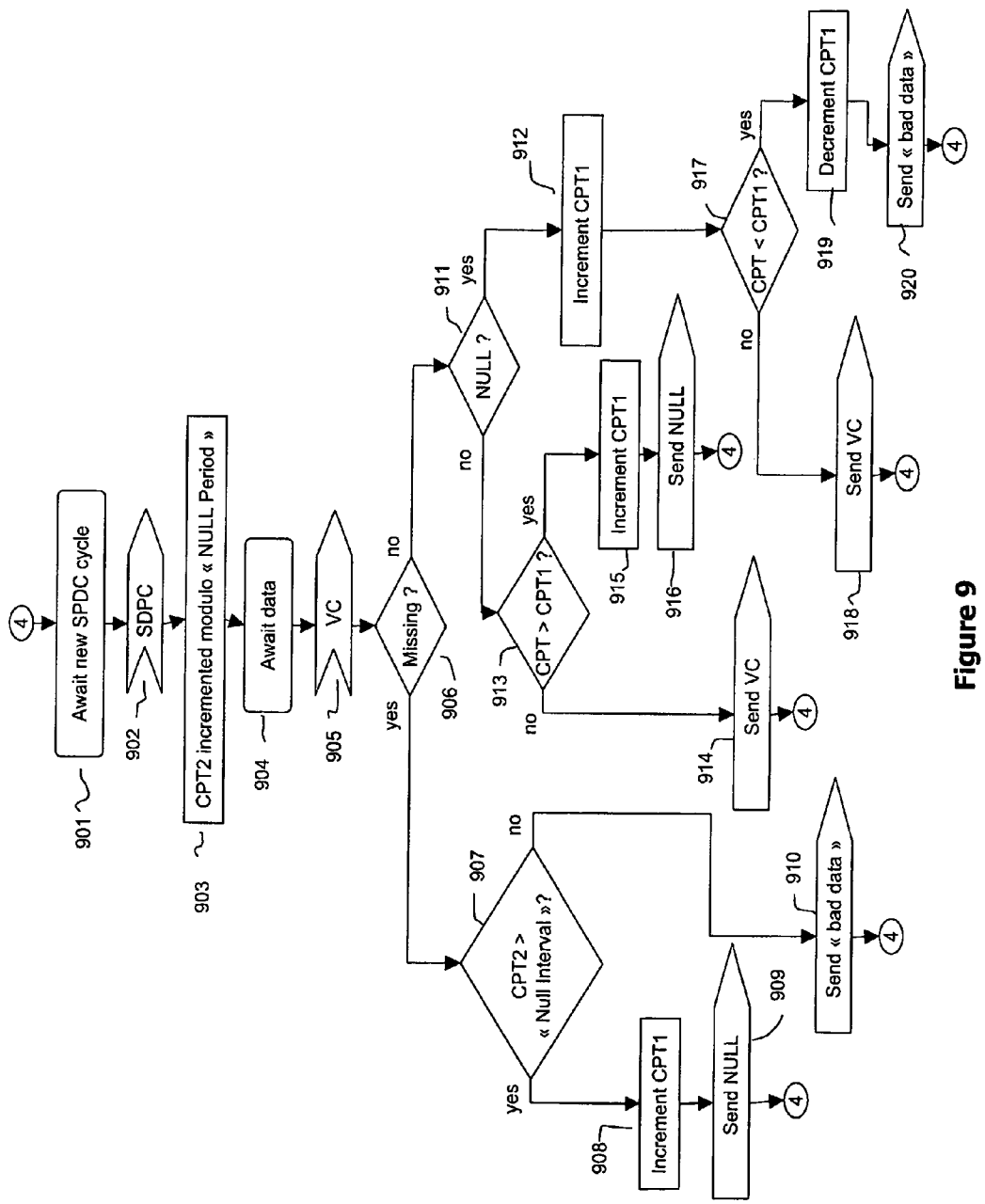
FIG. 9 illustrates a flow chart of the different steps performed, during a phase known as a prediction phase, by a prediction module "VC Predictor" of the reception module "Synchro RX" of FIG. 5.

FIGS. 8 and 9 illustrate the operations performed by a prediction module "VC Predictor" 503.

The prediction modules "VC Predictor" 503 all follow the same algorithm, each of the prediction modules "VC Predictor" 503 process a particular virtual channel, the correspondence between a prediction module "VC Predictor" 503 and a virtual channel number being defined statically.

A prediction module "VC Predictor" 503 has two modes of operation; an initial mode described with reference to FIG. 8 and a prediction and correction mode described with reference to FIG. 9.

To pass from the initial mode (FIG. 8) to the prediction and correction mode (FIG. 9), the control block "RX Controller" 502 must firstly receive a "synchro_ok" signal from the data presentation module 200 indicating that an application effectively consumes the data of the stream conveyed by the virtual channel and, secondly, receive the last synchronization symbol of a lossless series of data as explained in detail with reference to the steps of the algorithm of FIG. 8.

The algorithm of FIG. 8 provides a detailed description of the different steps performed during the initial phase of the prediction module "VC Predictor" 503.

When the system is powered on and whenever the "synchro_ok" signal 209 is negative, an initialization step 800 is executed. During this step, a counter CPT1 of "NULL" symbols is set at 0. This counter is used to count the "NULL" symbols received by the receiver device.

Then, in a step 801, the receiver device awaits the start of a new SDPC cycle.

In the following step 802, a new SDPC cycle is detected.

In a step 803, the control block "RX Controller" 502 awaits reception of data.

In a step 804, a piece of data in a virtual channel is received by the receiver device.

In a step 805, the data is tested in order to determine if it contains a synchronization symbol.

If the answer is yes, the counter CPT1 is incremented by one unit and the counter contained in the symbol "NULL" (CPT of the 308 format of FIG. 3) is saved in a register "Initial NULL Count" in a step 806 and then the control block "RX Controller" 502 goes into a state of waiting for a new SDPC cycle (801).

If the data received is not a synchronization symbol then, in a step 807, the data is tested to determine if it is a "MISSING" symbol representing the detection, by the network access management module 204, of the loss of a piece of data of the synchronous data stream considered.

If the answer is yes, the procedure is repeated starting from the step 800, because it is necessary to be sure of having reached the end of a sequence of synchronization symbols in order to exit the initialization phase and, thereafter, perform an accurate prediction.

If the data element is not a "MISSING" symbol then it is a data chunk.

In this case, a step 808 is used to ascertain that the synchronization symbols have been received with the data chunk.

If this is the case, it is an end of a sequence of synchronization symbols. Indeed, the value "NULL Period" indicates the period between two same sequences of use of a virtual channel beginning with a data chunk and ending with a synchronization symbol. A synchronization symbol followed by a piece of data then represents an end of a sequence (indicated 411 in FIG. 4).

If the result of the test of the step 808 is negative, i.e. if the counter CPT1 is equal to 0, then the sequence of synchronization symbols has not yet started. The step 801 is then repeated so as to wait for and process a new SDPC cycle.

If the result of the step 808 is positive, then the prediction module "VC Predictor" 503 is ready and reports this to the control block "RX Controller" 502 through the set of interfaces 505.

In a following step 809, a cycle counter CPT2 then goes to zero and the counter CPT1 takes the value of the register "Initial NULL Count").

Then, the first step 901 of the prediction and correction phase is activated (FIG. 9).

The algorithm of FIG. 9 gives a detailed view of the different steps of this phase of prediction and correction of a prediction module "VC Predictor" 503.

In a first step 901, the receiver device is awaiting a new SDPC cycle.

In a step 902, a new SDPC cycle is detected.

Once the new SDPC cycle starts, in a step 903, the counter CPT2 is incremented by one unit modulo the periodicity of the synchronization symbols as taught in the "NULL Period" register following the period of initialization of the prediction module "VC Predictor" 503 (refer to FIG. 11 described in greater detail here below in the description).

Then, in a step 904, the corresponding receiver device is awaiting reception of a piece of data.

In a step 905, the "VC Predictor" module receives the data from a virtual channel sent by the control block "RX Controller" 502 (referred to the steps 706 and 712).

In a step 906, the data is tested.

If this data is a "MISSING" symbol, i.e. if it is a data element detected by the network access management module 204 as being lost, then a prediction is necessary.

If not, the data is sent as such through the control block "RX Controller"502 to the SDPC cycle management module 201 through the interface 211 unless a previous prediction needs to be corrected.

If the data is a "MISSING" symbol, then in a step 907 the counter CPT2 is compared with the value of the register "NULL Interval". The value of the register "NULL Interval" combined with the value of the periodicity register of the symbols "NULL" ("NULL Period ") is used to indicate that cycle, during a period, in which the presence of synchronization symbols begins. A period is characterized by the fact that the synchronization symbols are contiguous and placed at the end of a period, as illustrated in FIG. 4.

If the value of the counter CPT2 is greater than the value of the register "NULL Interval", then the symbol "MISSING" received is interpreted as being representative of the loss of a synchronization symbol.

In this case, in a step 908, the counter CPT1 is incremented by one unit. Then, in a step 909, the result of the prediction is returned to the control module "RX Controller" 502 and then sent to the SDPC cycle management module 201

Then, the set of steps starting from the step 901 is repeated.

If the value of the counter CPT2 is smaller than the value of the register "NULL Interval" then, in a step 910, the symbol "MISSING" received is interpreted as being representative of a erroneous piece of data and then the result of the prediction is sent to the control module "RX Controller" 502 and then sent to the SDPC cycle management module 201.

Then, the set of steps starting from the step 901 is repeated.

If the piece of data is not a symbol "MISSING" (step 906), a step 911 is used to determine that the received symbol is a synchronization symbol or else a piece of applications data.

If the piece of data is a "NULL" symbol then, in a step 912, the counter CPT1 is incremented. This counter CPT1 can be used to find out especially the number of synchronization symbols that have been counted for this virtual channel.

A field of the synchronization symbol also mentions the account of the "NULL" values of the virtual channel analyzed as indicated by the source node. This account is indicated by the counter CPT of the format 308 of FIG. 3.

Then, in a step 917, these two values of the counter CPT and CPT1 are compared in order to detect any possible prior prediction error.

If the account of the sender indicated by the value of the counter CPT is greater than the account at (local) reception) of the "NULL" symbols indicated by the value of the counter CPT1, then the number of synchronization symbols predicted earlier is insufficient. This means that a "MISSING" type symbol has been previously interpreted as replacing an applications data whereas it replaced a "NULL" type synchronization symbol. It is then necessary to make a correction by replacing the data chunks by synchronization symbols (as many substitutions as there are missing synchronization symbols) during the following cases of data reception. This step consists in sending the data element unchanged to the control block "RX Controller" 502 during the step 918. This step is also valid for the case in which the counter CPT and CPT1 are equal (no prediction error, hence no prediction and the data element received is sent unchanged to the control block "RX Controller" 502).

Then, the set of steps starting from the step 901 is repeated following the detection of a new SPDC cycle.

If the account of the sender indicated by the value of the counter CPT is lower than the account in reception (local reception) of the "NULL" symbols indicated by the value of the counter CPT1, then the number of the synchronization symbols previously predicted is far too great. This means that a "MISSING" type symbol is interpreted beforehand as replacing a "NULL" type synchronization symbol whereas it replaced a piece of applications data. It is then necessary to make a correction by decrementing the counter CPT1 by one unit (step 919) and then subsequently replacing a synchronization symbol by a "bad data" type symbol (steps 919 and 920).

Then, all the steps from the steps 901 are repeated following the detection of a new SPDC cycle.

In a previous step 911, if the piece of data received is not a synchronization symbol, then it is a data chunk. It is then necessary either to hand over the data chunk as such or replace it by a synchronization symbol in order to correct a erroneous previous prediction.

In this case, in the step 913, the countdown of the sender indicated by the value of the counter CPT of the last "NULL" symbol received is compared with the countdown at (local) reception) of the "NULL" symbols indicated by the value of the counter CPT1.

If the countdown of the sender indicated by the value of the counter CPT1 is greater than the countdown at (local) reception) of the "NULL" symbols indicated by the value of the counter CPT1, then the counter CPT1 is incremented a one unit in a step 915.

Then a synchronization symbol replaces the data chunk in a step 916. The result is then transmitted to the control module "RX Controller" 502.

Then the set of symbols from the step 901 is repeated following the detection of a new SPDC cycle.

If the countdown of the sender indicated by the value of the counter CPT is lower than the countdown at (local) reception) of the "NULL" symbols indicated by the value of the counter CPT1, then the correction is done at the following instances of reception of the "NULL" symbols.

Then all the steps starting from the step 901 are repeated following the detection of a new SPDC cycle.

Figure 10:
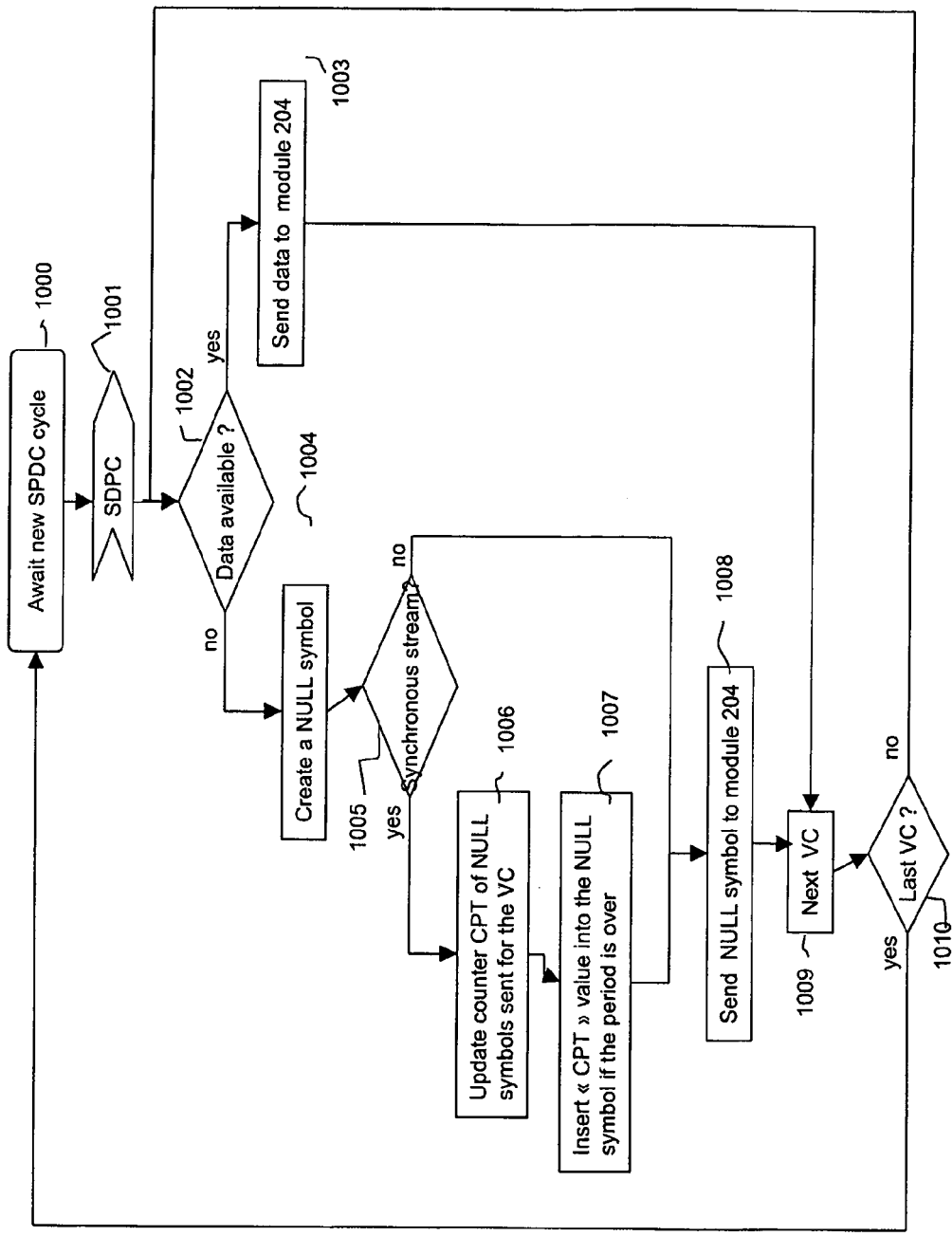
FIG. 10 is a flow chart of the different steps performed by a transmission block "TX Controller" of the transmission module "Synchro TX" of FIG. 6.

FIG. 10 describes the algorithm executed by the transmission block "TX Controller" 602.

At a step 1000, the sender module awaits a new SDPC cycle.

At a step 1001, a new SDPC cycle is detected.

At each new SDPC cycle, the transmission block "TX Controller" 602 carries out a reading of the FIFO type memories associated with each virtual channel in the SDPC cycle management module 201 through the interface 212.

In a step 1002, the memory associated with the virtual channel is tested in order to ascertain that there is a sufficient quantity of data (a minimum of 48 bits) to be sent to the network access management module 204.

If this is the case then, in a step 1003, the data elements are sent to the network access management module 204.

If there is not enough data to form a data chunk then, in a step 1004, a "NULL" type synchronization symbol created to cope with the lack of data.

In a step 1005, the "VC Parameters" module 603 corresponding to the current virtual channel is interrogated in order to determine whether this virtual channel is assigned to the transmission of a stream of synchronous data.

If the virtual channel is assigned to the transmission of a stream of synchronous data then, in a step 1006, the counter CPT of "NULL" symbols contained in the corresponding module "VC Parameters" 603 is incremented by one unit.

Then, in a step 1007, the value of this counter CPT is inserted into the previously created synchronization symbol (step 1004). Then, in a step 1008, the synchronization symbol is sent to the network access management module 204 in order to be transmitted on the network.

If the virtual channel is not assigned to the transmission of a synchronous data stream then, in a step 1008, the previously created synchronization symbol (step 1004) is sent to the network access management module 204 in order to be transmitted on the network.

Then, in a step 1009, a next virtual channel is selected.

In a following step 1010, a check is made to see whether all the virtual channels have been processed.

If this is the case, the control block "TX Controller" 602 of the sender device positions itself in a state of waiting for a new SDPC cycle (step 1000).

If not, the new virtual channel is analyzed in the step 1002.

Figure 11:
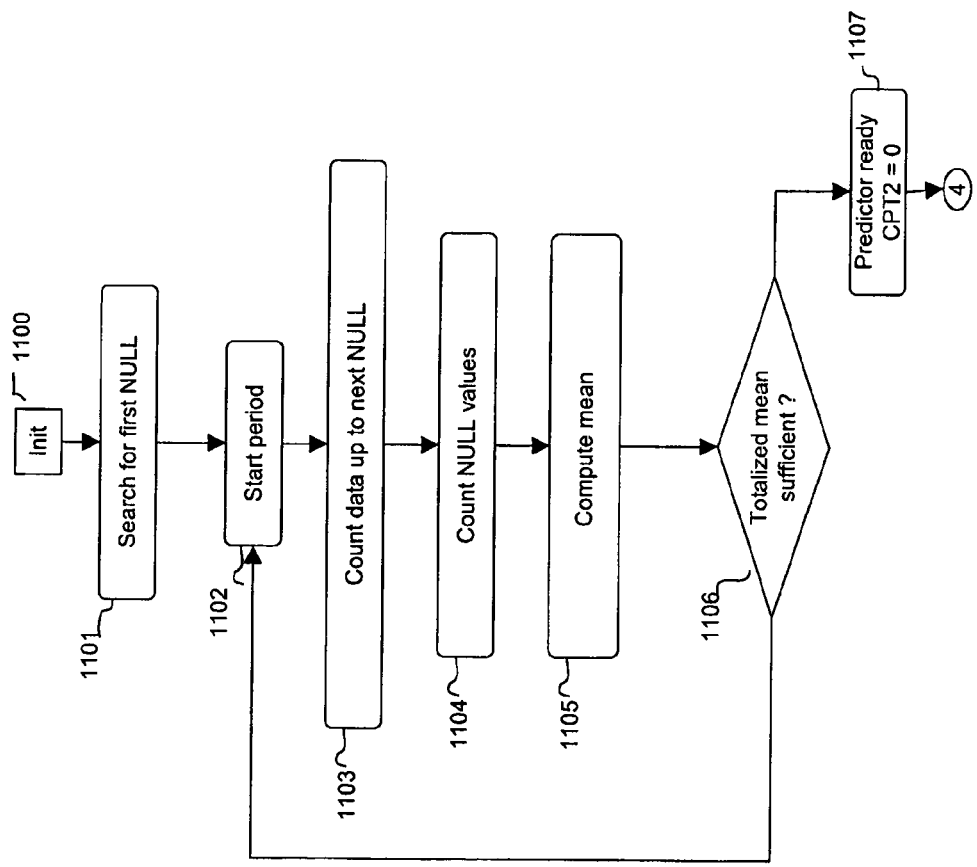
FIG. 11 is a flow chart of the different steps performed during a phase called an initial phase with learning with the a prediction module "VC Predictor" of the reception module "Synchro RX" of FIG. 5.

FIG. 11 gives an example of a learning algorithm which is executed by the prediction module "VC Predictor" 503 at the initialization phase in place of the algorithm given in FIG. 8.

At an initial step 1100, values known as "Learn_Period", "Learn_Interval", "Mean_Learn_Interval" and "Mean_Learn_Period" are set at 0. These values serve to compute the two parameters "NULL Interval" and "NULL Period".

The step 1100 is executed when the system is reset or whenever the "synchro_ok" signal 209 is negative or whenever a piece of data is lost ("MISSING" symbol) during the learning phase.

A following step 1101 consists of a search for the first synchronization symbol. This step consists in remaining in the same state with each new SDPC cycle so long as the data received is not a synchronization symbol.

At reception of a first synchronization symbol, a step 1102 is used to find the start of the period. The start of the period is marked by the reception of the first piece of data after a series of synchronization symbols. This step therefore ends as soon as a piece of data is received.

It must be noted that the loss of data during this step (which takes the form of the reception of a "MISSING" symbol) leads to the re-initialization of the algorithm (re-initialization at the step 1100). This transition is not shown in FIG. 11 for the sake of clarity.

From the step 1103 onwards, the succession of data elements received is counted up to the reception of the first synchronization symbol. The result of this account is then recorded in the "Learn_Interval" value.

Similarly, during the step 1102, the reception of "MISSING" symbol leads to a re-initialization of the algorithm.

At the first synchronization symbol received, in a step 1104, the synchronization symbols are counted up to reception of a piece of data. thus finishing a complete period (synchronization data and symbols). This account of synchronization symbols added to the "Learn_Interval" value then indicates the value "Learn_Period".

Just as in the step 1102, the reception of a "MISSING" symbol leads to a re-initialization of the algorithm.

At a step 1105, a mean is computed for the two values "Learn_Period" and "Learn_Interval" by means for totalizing variables and mean variables "Mean_Learn_Interval" and "Mean_Learn_Period".

At a step 1106, the number of learning operations of the two values "Learn_Period" and "Learn_Interval" is verified to find out if this number is sufficient to have a reliable mean (for example a mean over 10 values).

If the number is insufficient (for example smaller than 10), the algorithm loops to the step 1102 for the learning of additional values.

If not, in a step 1107 the prediction module "VC Predictor" 503 is declared to be ready. The values "Mean_Learn_Period" and "Mean_Learn_Interval" are loaded into the parameters "NULL Interval" and "NULL Period" of the prediction module "VC Predictor" 503.

The counter CPT2 of cycles is then set at the value 0.

Finally, the prediction phase of FIG. 9 is engaged.

The invention claimed is:

1. A method for synchronizing a data stream transmitted on a communications network, the data stream being transmitted from an emitter device to a receiver device in the form of data packets of a predefined size, wherein a data packet is filled up with a padding synchronization symbol if an amount of applications data to be transmitted in said data packet is below the predefined size of said data packet, wherein the receiver device performs the following steps:
obtaining an indication of a recurrence of filling of said data packets with padding synchronization symbols;
upon detection, at a position in said data stream, of a data loss symbol representative of lost data in a given data packet, predicting whether the lost data corresponds to applications data or a padding synchronization symbol, as a function of a position of said given data packet in said recurrence;
marking that said data stream contains, at said data loss symbol position, an erroneous applications data, if the result of said predicting step is that said lost data corresponds to applications data;
replacing said data loss symbol by a padding synchronization symbol, if the result of said predicting step is that said lost data corresponds to a padding synchronization symbol; and
counting a number of padding synchronization symbols received, including data loss symbols replaced by padding synchronization symbols;
receiving a piece of information from the emitter device indicating a number of padding synchronization symbols sent; and
if said number of padding synchronization symbols sent is greater than said number of padding synchronization symbols received, replacing applications data by a padding synchronization symbol in said data stream.

2. The method according to claim 1, wherein the receiver device further performs the following steps:
counting a number of padding synchronization symbols received, including the data loss symbols replaced by padding synchronization symbols;
receiving a piece of information from the emitter device indicating a number of padding synchronization symbols sent; and
if said number of padding synchronization symbols sent is smaller than said number of padding synchronization symbols received, marking that said data stream contains, at a given padding synchronization symbol position, an erroneous applications data.

3. The method according to claim 1 or 2, wherein each padding synchronization symbol comprises said piece of information indicating a number of padding synchronization symbols sent in said stream.

4. The method according to claim 1, wherein said step of obtaining an indication of a recurrence of filling of said data packets with padding synchronization symbols comprises a step of detecting a sequence of data packets comprising two successive sets of data packets, one of said sets comprising at least one data packet in which applications data is sent and the other of said sets comprising at least one data packet in which a padding synchronization symbol is sent.

5. A non-transitory computer-readable storage medium, storing a computer program comprising a set of instructions that can be executed by said computer in order to implement a method for synchronizing a data stream transmitted on a communications network, the data stream being transmitted from an emitter device to a receiver device in the form of data packets of a predefined size, wherein a data packet is filled up with a padding synchronization symbol if an amount of applications data to be transmitted in said data packet is below the predefined size of said data packet, wherein the receiver device performs the following steps:
- obtaining an indication of a recurrence of filling of said data packets with padding synchronization symbols;
- upon detection, at a position in said data stream, of a data loss symbol representative of lost data in a given data packet, predicting whether the lost data corresponds to applications data or a padding synchronization symbol, as a function of a position of said given data packet in said recurrence;
- marking that said data stream contains, at said data loss symbol position, an erroneous applications data, if the result of said predicting step is that said lost data corresponds to applications data;
- replacing said data loss symbol by a padding synchronization symbol, if the result of said predicting step is that said lost data corresponds to a padding synchronization symbol; and
- counting a number of padding synchronization symbols received, including data loss symbols replaced by padding synchronization symbols;
- receiving a piece of information from the emitter device indicating a number of padding synchronization symbols sent; and
- if said number of padding synchronization symbols sent is greater than said number of padding synchronization symbols received, replacing applications data by a padding synchronization symbol in said data stream.

6. A receiver device for receiving a data stream transmitted on a communications network, the data stream being transmitted from an emitter device to said receiver device in the form of data packets of a predefined size, wherein a data packet is filled up with a padding synchronization symbol if an amount of applications data to be transmitted in said data packet is below the predefined size of said data packet, wherein said receiver device comprises:
- means for obtaining an indication of a recurrence of filling of said data packets with padding synchronization symbols;
- means for predicting, activated upon detection at a position in said data stream of a data loss symbol representative of a lost data in a given data packet, enabling to predict whether the lost data corresponds to applications data or a padding synchronization symbol, as a function of a position of said given data packets in said recurrence;
- means for marking that said data stream contains, at said data loss symbol position, an erroneous applications data, if said means for predicting predict that said lost data corresponds to applications data;
- means for replacing said data loss symbol by a padding synchronization symbol, if said means for predicting predict that said lost data corresponds to a padding synchronization symbol; and
- means for counting a number of padding synchronization symbols received, including the data loss symbols replaced by padding synchronization symbols;
- means for receiving a piece of information from the sender device indicating a number of padding synchronization symbols sent; and
- means for replacing applications data by a padding synchronization symbol in said data stream, if said number of padding synchronization symbols sent is greater than said number of padding synchronization symbols received.

7. The receiver device according to claim 6, further comprising:
- means for counting a number of padding synchronization symbols received, including the data loss symbols replaced by padding synchronization symbols;
- means for receiving a piece of information from the sender device indicating a number of padding synchronization symbols sent; and
- means for marking that said data stream contains, at a given padding synchronization symbol position, an erroneous applications data, if said number of padding synchronization symbols sent is smaller than said number of padding synchronization symbols received.

8. The receiver device according to claim 6 or 7, wherein each padding synchronization symbol comprises said piece of information indicating a number of padding synchronization symbols sent in said stream.

9. The receiver device according to claim 6, further comprising means for detecting a sequence of data packets comprising two successive sets of data packets, one of said sets comprising at least one data packet in which applications data is sent and the other of said sets comprising at least one data packet in which a padding synchronization symbol is sent.

* * * * *